(No Model.) 2 Sheets—Sheet 2.
G. W. PEIRSOL.
COMBINED CORN PLANTER, POTATO PLANTER, POTATO DIGGER, AND CULTIVATOR.
No. 297,628. Patented Apr. 29, 1884.
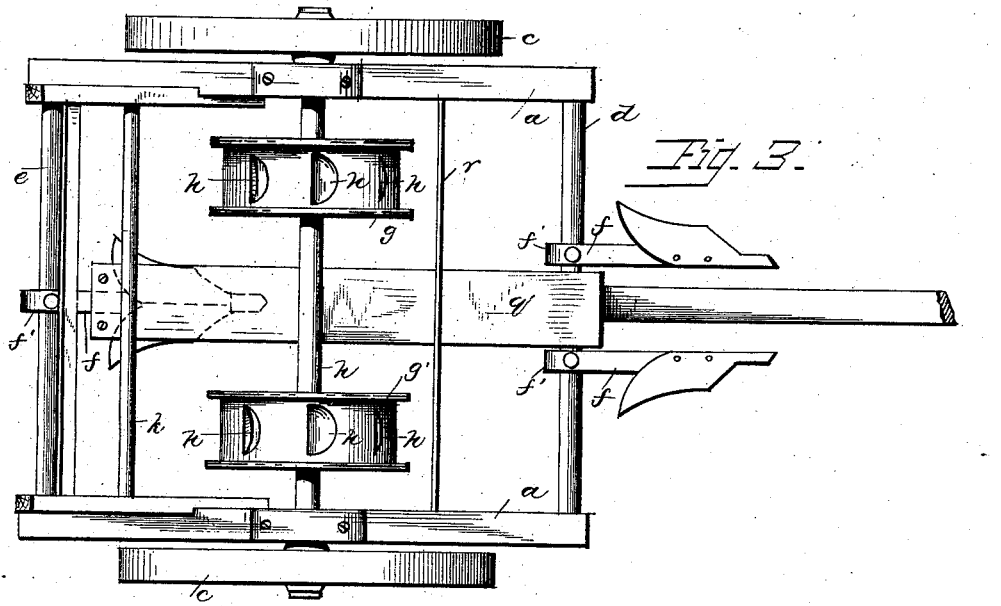
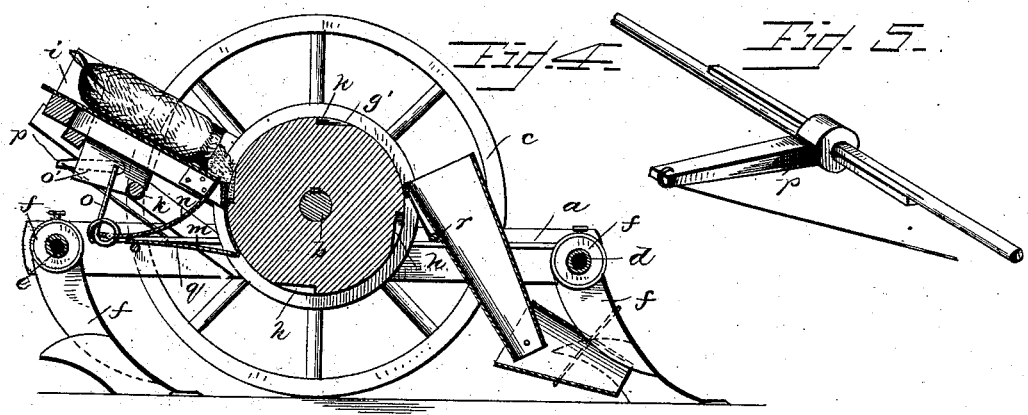
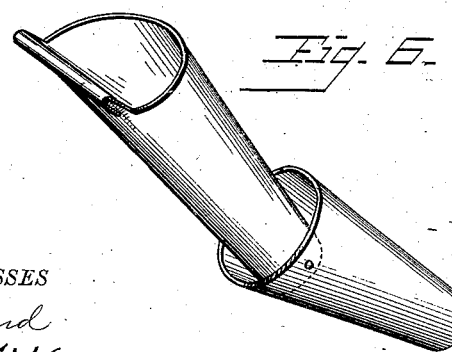
WITNESSES
INVENTOR
Attorneys

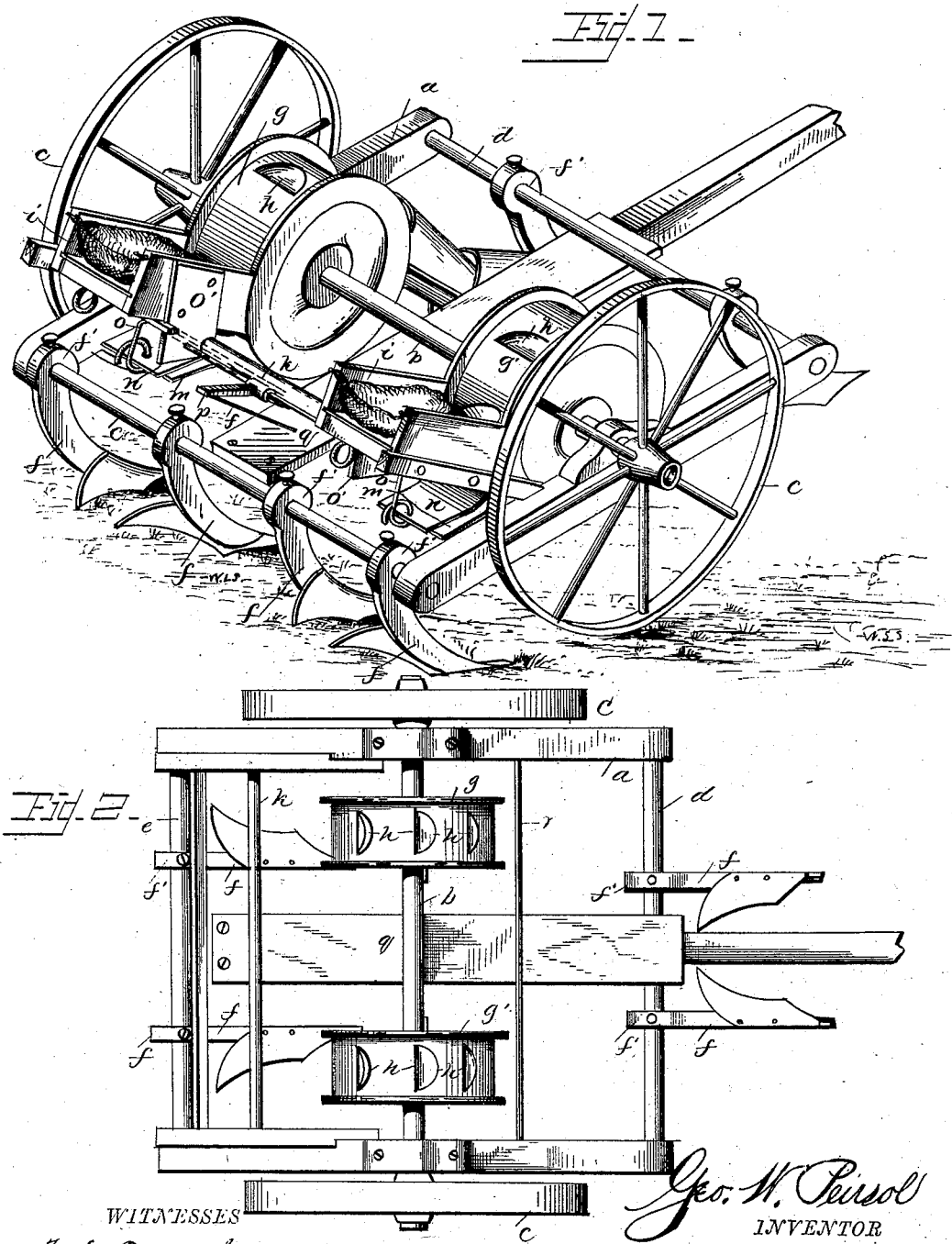

UNITED STATES PATENT OFFICE.

GEORGE WESLEY PEIRSOL, OF PARKERSBURG, WEST VIRGINIA.

COMBINED CORN-PLANTER, POTATO-PLANTER, POTATO-DIGGER, AND CULTIVATOR.

SPECIFICATION forming part of Letters Patent No. 297,628, dated April 29, 1884.

Application filed January 9, 1884. (No model.)

*To all whom it may concern:*

Be it known that I, GEORGE W. PEIRSOL, a citizen of the United States, residing at Parkersburg, in the county of Wood and State of West Virginia, have invented a new and useful Combined Corn-Planter, Potato-Planter, Potato-Digger, and Cultivator, of which the following is a specification, reference being had to the accompanying drawings.

Figure 1 of the drawings is a perspective view of my combined agricultural implement. Fig. 2 is a view showing the machine arranged as a cultivator. Fig. 3 shows the machine arranged as a potato-digger. Fig. 4 is a sectional view of Fig. 1. Fig. 5 is a detail view of the adjustable coupling and levers for controlling the feed-checks, and Fig. 6 is a detail view of the hinged discharge-spouts.

This invention has relation to a combined corn-planter, potato-planter, potato-digger, and cultivator; and it consists in the construction and novel arrangement of devices, as will be hereinafter fully described, and particularly pointed out in the claims appended.

The objects I aim at in this invention are to provide a machine whereby I may be enabled to plant either corn or potatoes, cultivate the crop in either instance, and in the case of a potato crop, provide for harvesting the same by simply adjusting the plows pertaining to the machine, as I will describe more fully hereinafter.

Referring by letter to the accompanying drawings, $a$ designates the frame of the machine which is mounted on the axle $b$, to which the supporting and driving wheels $c$ $c$ are keyed. The front and rear transverse shafts, $d$ and $e$, of the frame $a$ are preferably made hollow, to lighten the structure. These shafts $d$ and $e$ are keyed in the side rails of the frame $a$, in order that they may be adjusted to regulate the depth of the plows attached to them, so that the latter may operate deep or shallow, as may be necessary. The plow-standards $f$ are curved and have eyes $f'$, that receive the hollow shafts, and these also are made adjustable on the hollow shafts laterally, so that the distance between furrows may be regulated. These standards are provided with furrow-openers, right-and-left-hand plows, and mold-boards, as may be necessary to perform the different classes of work required.

Two drop-wheels, $g$ and $g'$, are keyed to the axle $b$ within the frame $a$, so as to be laterally adjustable, to vary the distance between the furrows, if desired. These dropping-wheels are provided with seed-pockets or receptacles $h$ for corn or potatoes, as the case may be. Immediately in the rear of each drop-wheel is provided an inclined hopper, $i$, supported on a transverse shaft, $k$. These inclined hoppers are of a size to receive a two-bushel sack with its contents, and this sack should be secured by its base or bottom to the upper edges of the hopper, its mouth being downward to feed the seed to the drop-wheel. Beneath the hoppers and secured to a transverse shaft, $l$, and in rear of the drop-wheels, are the shields $m$ $m$, which protect the seed-pockets in the drop-wheels until they come up to the mouths of the inclined hoppers. The feed-checks $n$ $n$ are composed of two angular curved sheet-iron plates, each of which are secured to a crank-arm, $o$, having bearings in the uprights $o'$, which support the hoppers. These crank-arms $o$ are connected by a coupling-lever, $p$, so that they are laterally adjustable with the drop-wheels, hoppers, plow-standard, &c., when changes are to be made. A foot-lever, $q$, is connected to the coupling-lever $p$, so that the driver with his foot may elevate the feed-checks, to cut off the supply of feed at any time. When the pressure of the driver's foot is removed, the feed-checks will recede by gravity.

In front of the drop-wheels is a transverse shaft, $r$, to which the upper ends of the hinged seed-tubes are adjustably connected. These seed-tubes are also connected to the rear edges of the curved adjustable front plow-standards. The seed-tubes are made in hinged sections in order that they may be adapted to the various adjustments of the hollow shaft and the front plow-standards. There are two sets of drop-wheels, one for corn and one for potatoes, so that the sizes of the seed-pockets must vary.

All of the parts of the machine except the main frame and supporting-wheels are laterally adjustable, and the plow-standards are vertically adjustable on their shafts as well as laterally adjustable thereon. When used as a cultivator, two standards with right and left mold-boards are keyed to the front shaft, between two rows of the corn or potatoes, and two standards with right and left mold-boards on the rear hollow shaft on the outside of the two rows. When digging potatoes, two standards with right and left mold-boards are placed on the front shaft outside of the row to turn the soil away from the row, and a single standard with a double mold-board is put on the rear hollow shaft to open the ridge of potatoes. The drop-wheels have their seed-pockets made with rear vertical shoulders and concave bottoms, so that the seed has a tendency to seek the middle line of the periphery of the wheel, which insures its delivery to the seed-tube as the wheel revolves.

This implement may be cheaply constructed, and possesses the advantages of combining four implements in one—viz., a corn-planter, a potato-planter, a cultivator, and a potato-digger—and but slight adjustments are required to effect the necessary changes to convert it from one to the other.

Having thus fully described my invention, what I claim as new, and desire to secure by Letters Patent, is—

1. In an organized machine, the combination, with the adjustable dropping-wheels having seed-pockets in their peripheries, and the hinged seed-tubes connected to the opening plows, of the inclined adjustable hoppers, the adjustable shields, the adjustable feed-checks, the operating-lever, and the adjustable covering-plows, substantially as specified.

2. In an organized machine, the combination, with the drop-wheels, inclined hoppers, and adjustable shields, of the feed-checks $n\ n$, secured to the crank-arms $o$, connected by the coupling-lever $p$, and the foot-lever $q$, connected to the coupling-lever $p$; and fulcrumed on the frame of the machine, substantially as specified.

3. In a seeding-machine, the combination, with the driving mechanism, feed-wheels, and seed-tubes, of the laterally-adjustable inclined hoppers, substantially as specified.

In testimony that I claim the foregoing as my own I have hereto affixed my signature in presence of two witnesses.

GEORGE WESLEY PEIRSOL.

Witnesses:
S. J. WARDER,
D. T. BROUGHTON.